May 8, 1962  L. STATLER  3,033,590
OVERLOAD SPRING
Filed March 12, 1958
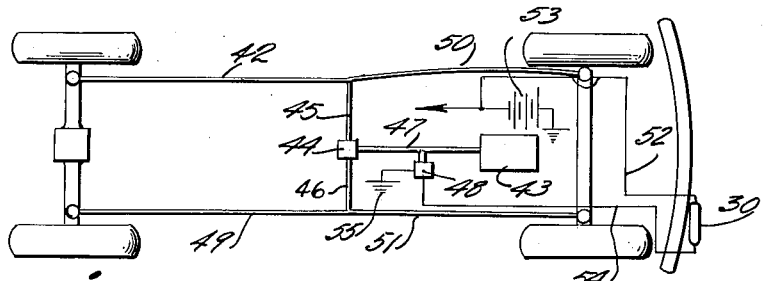
INVENTOR.
Lowell Statler
BY *Victor J. Evans & Co.*
ATTORNEYS

United States Patent Office 3,033,590
Patented May 8, 1962

3,033,590
OVERLOAD SPRING
Lowell Statler, 126 Carol, Bellevue, Ohio
Filed Mar. 12, 1958, Ser. No. 720,962
3 Claims. (Cl. 280—124)

This invention relates to shock absorbers, snubbers, overload springs, and the like designed to be connected between the frame or chassis and axle of motor vehicles, and in particular a shock absorber having a spring in combination with telescoping cylinders or a piston with the spring extended from an end of the cylinder or with the spring suspended by a disc from a shoulder on a piston rod extended from the upper end of the cylinder of the shock absorber and with an auxiliary fluid pressure cylinder connected to the disc for tilting the spring, turning on an ignition circuit of a vehicle on which the device is positioned whereby a piston in the auxiliary cylinder tilts the spring separating the pawls carried by the lower end of the spring from racks positioned on opposite sides of the cylinder of the shock absorber.

The purpose of this invention is to provide a combination shock absorber, overload spring, and snubber which is used primarily in negotiating a curve and which maintains the floor of the vehicle passing around a curve in a substantially level position.

Various types of snubbers and shock absorbers have been provided for motor vehicles and some have combined springs with hydraulic or pneumatic jacks or cylinders, however, such devices operate continuously and do not provide compensating means for retaining a vehicle in a level position negotiating a curve. With this thought in mind this invention contemplates a snubber having latching means whereby a spring around the cylinder is operatively connected to the cylinder and frame of the vehicle for general use and that is adapted to be actuated to release the spring when it is only desired to use the shock absorber elements.

The object of this invention is, therefore, to provide a double acting spring the ends of which are connected to the body and axle of the vehicle, respectively, in which the spring is not operatively connected to the axle until the vehicle body is depressed by the load carried thereby, and in which the effective length of the spring is dependent upon the load, whereby a free ineffective spring is provided and upon upward or downward movement of the vehicle beyond the free length of the spring the pawls engage teeth of racks and restrict further upward or downward movement of the body of the vehicle.

Another object of the invention is to provide a combination shock absorber and snubber in which a spring around the cylinder of the shock absorber is secured to the frame of the vehicle at one end and to the housing of the shock absorber at the other whereby the tension of the spring retains the floor of a vehicle substantially level.

A further object of the invention is to provide a combination shock absorber and snubber having a spring extended around a cylinder with the spring and cylinder connected to the frame of the vehicle at the upper end and with the lower end of the cylinder connected to the axle of the vehicle and removably connected to the lower end of the spring in which the device is of a simple and economical construction.

With these and other objects and advantages in view the invention embodies a cylinder having a stud extended from the lower end and a piston rod extended from the upper end with suitable coupling elements for connecting the piston rod to the chassis or frame of a vehicle and with toothed bars positioned on opposite sides of the cylinder, a spring extended around the cylinder and having pawls on a coil at the lower end for engaging the toothed bars of the cylinder and a disc on the upper end for freely connecting the upper end of the spring to the piston rod extended from the upper end of the cylinder, and a pressure actuated cylinder for tilting the disc to actuate the lower end of the spring to separate the pawls from the toothed bars.

Other features and advantages of the invention will appear from the following description taken in connection with the drawing, wherein:

FIGURE 1 is a plan view of a chassis of a motor vehicle illustrating the relative positions of the snubbers and associated parts.

FIGURE 2 is a side elevational view of the snubber with holding elements at the lower end of a spring and cylinder separated and with mounting elements at the ends of the snubber shown in section.

FIGURE 3 is a side elevational view of the snubber with connecting parts broken away and with the mounting of the auxiliary cylinder at the upper end of the device shown in section.

Referring now to the drawing wherein like reference characters denote corresponding parts the improved snubber of this invention includes a cylinder 10 having a piston rod 11 extended from the upper end and a stud 12 with a threaded end 13 extended from the lower end, a spring 14 extended around the cylinder and having pawls 15 carried by the lower coil and secured thereto by pins 16, racks 17 secured to the outer surface of the cylinder by pins 18 and positioned to coact with the pawls 15 for anchoring the lower end of the spring on the cylinder, a disc 19 secured to the upper coil 20 of the spring, such as by welding and positioned to rest upon a shoulder 21 of the piston rod 11, and an auxiliary cylinder 22 having a piston 23 therein carried by a bracket 24 adjustably mounted on a threaded section 25 of the piston rod 11 by nuts 26 and 27, the piston 23 of the auxiliary cylinder 22 being connected by a piston rod 28 to an eye 29 on the upper surface of the disc 19 and a mercury system switch 30 mounted on a part of the vehicle and positioned to close a circuit as the vehicle tilts in negotiating a turn.

The stud 12 at the lower end of the cylinder is connected to an axle of the vehicle, as indicated by the numeral 31 with the stud secured in an opening in the axle by a nut 32.

The upper end of the upper section 25 of the piston rod 11 of the cylinder 10 is provided with an eye 33 by which the piston rod is secured with a fastener 34 in ears 35 and 36 depending from a member 37 of the chassis of the vehicle and the fastener 34 is secured in position by a bolt 38 having a nut 39 on a threaded end 40 thereof.

The auxiliary cylinder 22 is provided with a spring 41 that urges piston 23 downwardly and the upper end of the cylinder is provided with a vacuum connection 42 which, as illustrated in FIGURE 1 extends to the intake manifold of an engine 43 through a control valve 44 and tubes 45, 46, and 47.

The vehicle operates in the conventional manner wherein the pawls 15 are separated from the racks 17, as shown in FIGURE 2 and with tilting of the body of vehicle, such as in negotiating a curve terminals of the mercury switch 30 are closed completing a circuit to the solenoid control vacuum valve 48 wherein vacuum is shut off from the cylinder 22 permitting the spring to return to the position illustrated in FIGURE 3 with the pawls 15 in meshing relation with the racks 17. With the lower end of the spring anchored on the outer surfaces of the cylinder 10 tension of the spring retards the tilting action of the chassis of the vehicle, thereby retaining the vehicle in substantially a horizontal position.

The snubbers or overload springs are positioned adjacent the four wheels of the vehicle and, as shown in FIG- URE 1 the cylinders 22 of the snubbers are connected to the vacuum control valve 44 by tubes 42, 49, 50 and 51.

One side of the mercury switch 30 is connected by a wire 52 to one terminal of a battery 53 and the other side is connected by a wire 54 to the vacuum control valve 48, the opposite terminal of which is coneted to a ground 55.

Operation

The spring 14 of the snubber or overload spring is shown with the pawls 15 in meshing relation with the teeth of the racks 17, in FIGURE 3, and upon turning the ignition key of the vehicle the engine starts and vacuum is applied to the auxiliary cylinder 22 which tilts the spring 14 to the free position wherein the teeth of the pawls are separated from the racks, as shown in FIGURE 2 and whereby springs of a vehicle upon which the snubber is mounted take the load in the conventional manner.

In negotiating a curve with the vehicle loaded at sufficient speed to cause the vehicle to lift the mercury switch on the low side of the vehicle a circuit is completed to the solenoid actuated control valve 48 which closes the vacuum valve permitting an auxiliary spring 41 to swing the spring 14 to the vertical position wherein the pawls 15 mesh with the teeth of the racks 17 and as one side of the vehicle attempts to move upwardly the tension of the springs on that side restricts upward movement causing the vehicle to ride substantially level. After passing the curve the body of the vehicle returns to the free or level position and the circuit is broken by the mercury switch with the vacuum actuated spring in the tilting position shown in FIGURE 2 whereby the overload spring 14 is released and the shock absorbers of the vehicle operate in the conventional manner.

The double acting spring of this invention is mounted on a motor vehicle with the upper end connected to the body and the lower end connected to the axle, however, the spring is not operatively connected until the vehicle is depressed by the load carried by the vehicle and after the load is applied the lower end of the spring is connected to the axle. The effective area of the spring is dependent upon the load and a free ineffective area is provided under normal operating conditions. Upward or downward movement of the vehicle, such as in passing over an obstruction or traveling around a curve reacts upon the spring whereby upward or downward movements beyond said free area are limited by the spring.

It will be understood that modifications, within the scope of the appended claims, may be made in the design and arrangement of the parts without departing from the spirit of the invention.

What is claimed is:

1. In a stabilizer for motor vehicles, the combination which comprises a vertically disposed stabilizer cylinder, mounting means at the upper end of the cylinder, mounting means at the lower end of the cylinder, a spring depending from the mounting means at the upper end of the cylinder and extended around the cylinder, toothed racks positioned on oposite sides of the cylinder, pawls carried by the lowermost convolution of the spring and positioned to engage the teeth of the racks, and an auxiliary cylinder carried by the mounting means of the stabilizer cylinder and connected to the spring whereby upon application of suction to said auxiliary cylinder the pawls on the lowermost convolution of the spring are separated from the racks of the cylinder.

2. In a stabilizer for motor vehicles, the combination which comprises a stabilizer cylinder, mounting means at the upper end of the cylinder, mounting means at the lower end of the cylinder, resilient means depending from the mounting means at the upper end of the cylinder and extended around the cylinder, racks positioned on opposite sides of the cylinder, pawls carried by the resilient means and positioned to engage the racks, and an auxiliary cylinder carried by the mounting means of the stabilizer cylinder and connected to the resilient means whereby upon application of suction to said auxiliary cylinder the pawls on the resilient means are separated from the racks of the cylinder.

3. In a stabilizer for motor vehicles, the combination which comprises a stabilizer cylinder, mounting means at the upper end of said cylinder, mounting means at the lower end of said cylinder, a spring depending from the mounting means at the upper end of said cylinder and coiled around said cylinder, at least one toothed rack affixed to one of said cylinder and a lower portion of said spring and extending in a direction parallel to the longitudinal extent of said cylinder, at least one pawl affixed to the other of said cylinder and said lower portion of said spring and positioned to engage the teeth of said rack in any of a plurality of positions, and means associated with said cylinder effective to engage and disengage said rack and said pawl in each of said plurality of positions, the positions being determined at least in part by the load carried by a vehicle upon which the cylinder is mounted.

References Cited in the file of this patent

UNITED STATES PATENTS

| | | |
|---|---|---|
| 1,301,003 | Plunkett | Apr. 15, 1919 |
| 1,975,642 | Landeweer | Oct. 2, 1934 |
| 2,624,592 | MacPherson | Jan. 6, 1953 |
| 2,743,941 | Walker | May 1, 1956 |
| 2,756,045 | Savory | July 24, 1956 |
| 2,788,987 | Lewis | Apr. 16, 1957 |
| 2,825,578 | Walker | Mar. 4, 1958 |
| 2,892,636 | Walker | June 30, 1959 |